Sept. 29, 1931. H. M. ELY Re. 18,210

RAIL TURNING DEVICE

Original Filed March 15, 1926 2 Sheets-Sheet 1

Inventor
H. M. Ely, deceased,
Bethlehem Steel Co.,
Assignee.
By R. S. C. McDougherty
Attorney Sept. 29, 1931. H. M. ELY Re. 18,210

RAIL TURNING DEVICE

Original Filed March 15, 1926 2 Sheets-Sheet 2

Inventor

H. M. Ely,
deceased,
Bethlehem Steel Co.,
Assignee.

By R. S. A. Dougherty, Attorney

Reissued Sept. 29, 1931

Re. 18,210

UNITED STATES PATENT OFFICE

HAROLD M. ELY, DECEASED, LATE OF HARRISBURG, PENNSYLVANIA, BY BETHLEHEM STEEL COMPANY, OF BETHLEHEM, PENNSYLVANIA, ASSIGNEE

RAIL TURNING DEVICE

Original No. 1,775,851, dated September 16, 1930, Serial No. 94,780, filed March 15, 1926. Application for reissue filed February 6, 1931. Serial No. 514,002.

The invention relates to a mechanism for handling rolled shapes, and particularly to a device for handling rails or similar objects while being straightened at a gag press. In saying "rails or similar objects" is meant heavy, extended articles, that is to say articles which are heavy and have one dimension much greater than the others. A rail, for example, is heavy and its length is much greater than its cross sectional dimensions.

Heretofore it has been customary to employ manual labor to turn over rails about their longitudinal axes from one position to another so that they are correctly positioned under a gag press for straightening. However, owing to the demand for increased cross section as well as increased length of rails the handling operation has become an extremely onerous task even though it is the the general practice to increase the number of operators handling the rails as the weight of rails increase. It is, therefore, the object of the invention to provide a device for mechanically turning a rolled shape to its correct position in a gag press.

A further object of the invention is to provide a novel means for mounting a device for mechanically handling a rolled shape so that said device is free to automatically adjust itself in a vertical plane so as not to interfere with the rotation of the article being handled.

The apparatus stated generally comprises a swinging frame freely mounted on a shaft which is suitably journaled in brackets supported on a base. The latter is located at the side of the gag press, or may be formed as part thereof, and positioned so that the central axis of a rim pinion, rotatably mounted in the frame, is in substantial alignment with the path of travel of the article, such as a rail, being fed to the gag press. The rim gear is provided with inwardly projecting lugs which engage the rail between the under surface of the head portion and the upper surface of the flange portion. The rim gear is geared to a pinion fixedly mounted on the aforementioned shaft and the latter is operatively connected to a reversible motor.

Figure 1:
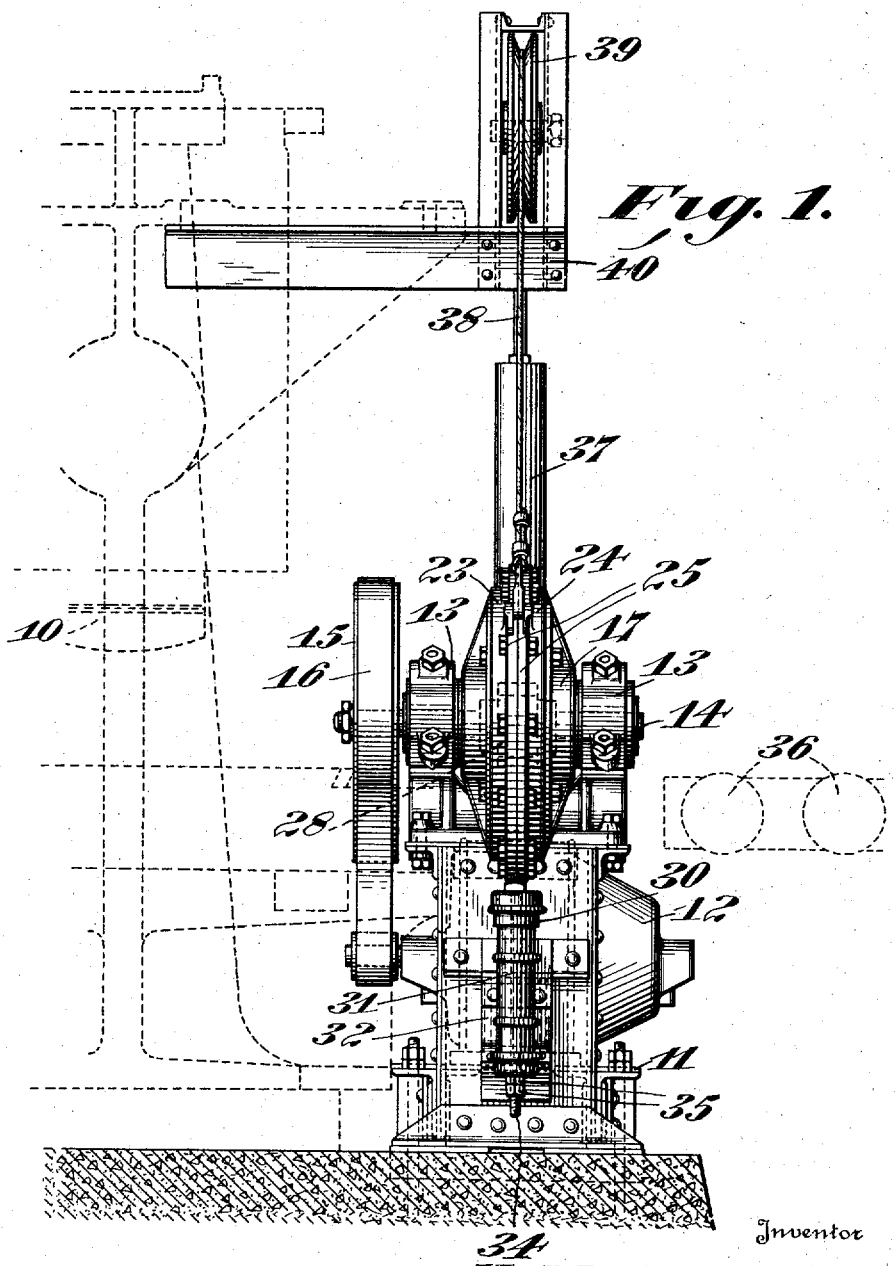
Figure 2:
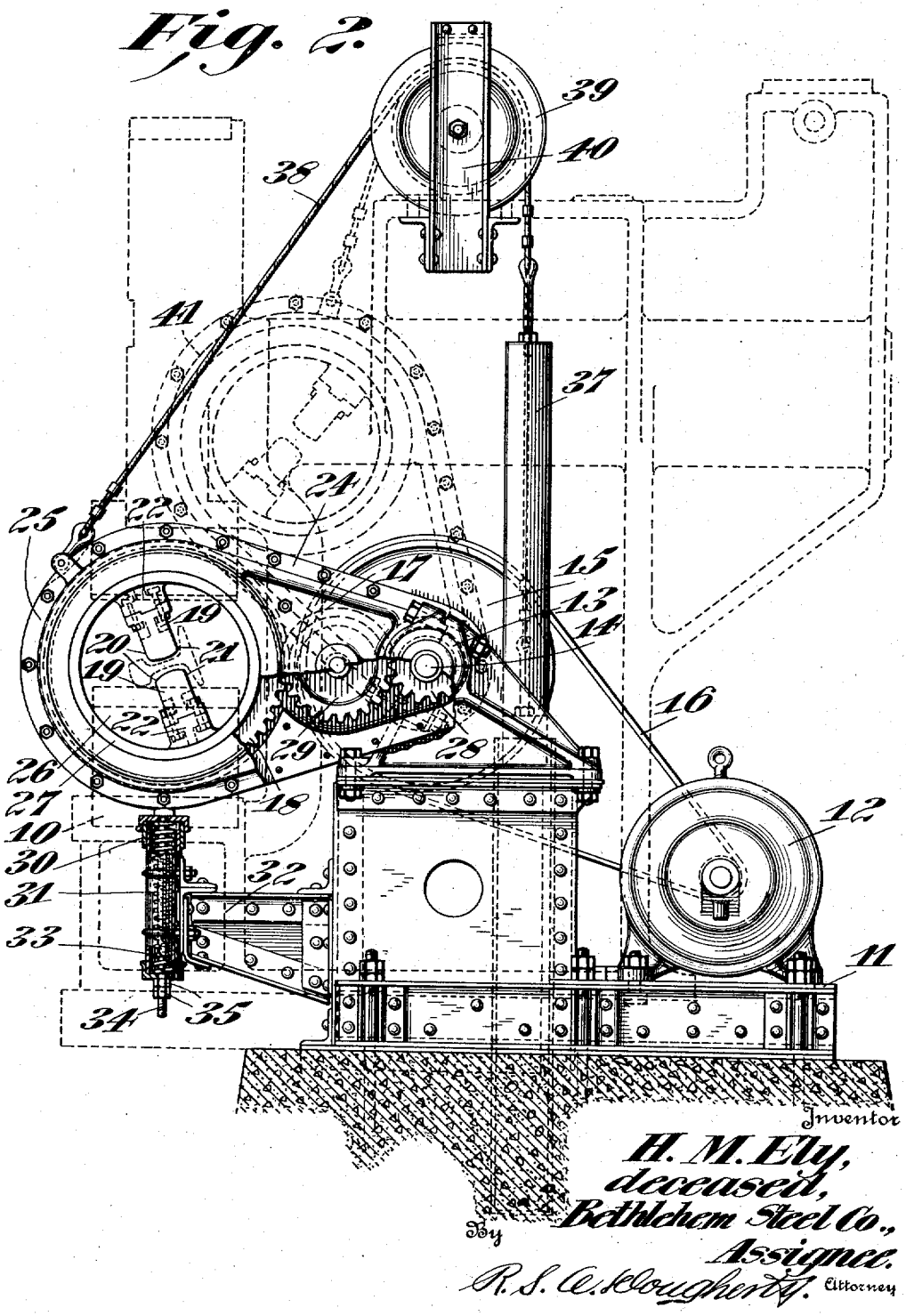

The novel features will be more fully understood from the following description and claims taken with the drawings, in which:

Fig. 1 is a front elevation of the rail handling device with parts of the casings broken away to more clearly show the construction; and Fig. 2 is a side elevation of the device shown in Fig. 1.

Referring now to the drawings: 10 indicates a gag press, shown in broken lines, for straightening rails and the like and may be of any well known type, but this has not been shown in detail because such details do not form part of the invention.

A bed plate 11 is positioned at the side of the gag press and supports a reversible motor 12 and a pair of trunnion brackets 13. A shaft 14 is journaled in the brackets 13 and is provided at one end with a fixed pulley 15 which is operably connected, through the medium of a belt 16, to a pulley fixed to the armature shaft of the motor 12. A frame 17 is rotatably mounted on the shaft 14 and extended laterally therefrom, normally in a substantially horizontal plane. A rim gear 18 is rotatably mounted in the extending end of the frame 17 and is provided with inwardly projecting lugs 19. The latter extend towards each other and are spaced apart a distance to allow the free passage of the web portions of a rail to the gag press, but, however, are in sufficiently close proximity so that the side faces 20 and 21 of said lugs engage the undersurface of the rail head and the upper face of the rail flange, respectively. The lugs 19 may be formed as an integral part of the rim gear, but, preferably they are detachably mounted on pads 22, formed on the inside of said gear and fastened thereto by suitable means such as the bolts shown in Fig. 2.

By having the lugs 19 detachable their size and form may be changed as desired to suit the size and shape of the particular structural unit to be handled and in this manner the device may be easily adapted to handle a large range of sizes and variety of shapes. The frame 17 is preferably made in two parts 23 and 24, each having flanges 25 which are bolted together and are provided with an opening 26. The rim gear is provided with cylindrical bearing portions 27, on each side thereof, which engage the openings 26 formed in the frame 17 and is thus rotatably supported by the latter.

A pinion 28 is keyed to the shaft 14 and an intermediate pinion 29 rotatably mounted on the frame 17 meshes with pinion 28 and also with the teeth formed on the exterior periphery of the rim gear 18. It will be seen that the latter is operatively connected to the motor 12 through the medium of the pinions 29, 28 and the belt 16 and by operating the motor the rim gear may be caused to be rotated in either direction.

It should be noted that the frame 17 is free to move bodily about the axis of the shaft 14 and such movement does not interfere with the rotation of the rim gear 18, that is, while the latter is rotated about its axis, said frame is free to move in a path about the axis of the shaft 14. The frame 17 is normally supported on a yielding plunger 30 which is slidingly mounted on the hollow cylindrical member 31. The latter is firmly held in brackets 32 which are bolted to and extend laterally from the bed plate 11. The plunger 30 is supported on a coil spring 33 mounted in the bore of the member 31 beneath said plunger, and depended from the latter is a rod 34 which extends axially through said spring and through an opening in the bottom wall of said member. The extending end of the rod 34 is threaded and is engaged by a nut 35. The latter is adjustable on said rod and reacts against the lower face of the member 31 to change the normal upward position of the plunger. Normally the frame 17 is supported on the plunger 30 and the lugs 19 are disposed in such a position that the web portion of the rail passes between said lugs as a rail is advanced by the roller train 36 shown in broken lines to the gag press.

A weight 37 is provided to counterbalance the frame 17 and is connected to the latter by means of a cable 38 passing over a pulley 39 which is rotatably mounted on the fixed brackets 40. The frame 17 being counterbalanced may be easily moved upwardly above the axis of the shaft 14 and be positioned, as shown by the dotted line outline 41 in Fig. 2, so that it does not interfere with the handling of the lighter sections when it is desired to handle such sections manually.

In the operation of the rail turning device, assuming the frame 17 to be in its horizontal position as shown in Fig. 2, the rail is fed to the gag press by the roller train 36, the web portion of the rail passing between the ends of the lugs 19. To turn the rail over in order that one or the other of the sides, head or base rests on the table of the press so that the proper face is presented to the anvil when the pressure is applied to straighten the rail, the motor is started in the desired direction and the rim gear is rotated. When the rim gear rotates the lugs 19 engage the head and flange of the rail and the latter is turned about its longitudinal axis. As heretofore mentioned, the frame 17 is supported on the yielding plunger 31 and is balanced by the weight 37 so that it is free to automatically adjust itself in the vertical plane and does not interfere with turning of the rail, and furthermore, does not resist the flexing of the rail when the latter is being straightened in the press.

It will be seen from the foregoing description that there is provided a device for mechanically turning over a rail and the like about its longitudinal axis and which is freely mounted so that it does not interfere with the turning of the rail and also does not resist the flexing of the rail while the latter is being straightened in the gag press.

While there is shown and described a device for handling rails it is manifest that such a device may easily be adapted to handle other structural shapes such as for example I-beams, H-beams, channels, angles, etc.

While the invention has been shown in but one form, it will be obvious to those skilled in the art that it is not so limited but is susceptible of various other changes and modifications without departing from the spirit thereof, and it is desired, therefore, that only such limitations shall be placed thereupon as are imposed by the prior art or as are specifically set forth in the appended claims.

Having thus described the invention, what is claimed as new and desired to be secured by Letters Patent is:

1. A device for handling articles comprising a swinging frame, means to support said frame including a shaft, an annular member adapted to engage the articles to be handled, means interposed between said shaft and said member to actuate the latter, and means for rotating said shaft.

2. A device for handling rails and the like objects comprising a swinging frame, means to support said frame including a shaft, an annular member rotatably mounted on said frame, teeth formed on said member, a pinion fixed to said shaft and in geared relation to said teeth, means projecting from said member adapted to engage the rail to be handled, and means for rotating said shaft.

3. A device for handling rails and like objects comprising a swinging frame, means to support said frame including a shaft and a yieldable member, means mounted on said frame adapted to engage the object to be handled, and means for actuating the last mentioned means.

4. A device for handling rails and like objects comprising a swinging frame, means to support said frame including a shaft and a yieldable member, a member rotatably mounted on said frame, gear teeth formed on said last mentioned member, a lug extending from the latter adapted to engage the object to be handled, a pinion mounted on said shaft and in geared relation to said teeth, and means for rotating said pinion.

5. A device for handling rails comprising a swinging frame, means to support said frame including a shaft and a yieldable member, a rim gear rotatably mounted on said frame, a lug extending from said rim gear, a pinion mounted on said shaft, an idler gear mounted on said frame in geared relation to said pinion and said rim gear, and means to rotate said pinion.

6. A device for handling articles comprising a swinging frame, a support for said frame including a shaft and a balancing means, a member mounted on said frame adapted to engage the article to be handled, and means to actuate said member.

7. In a device for manipulating heavy articles, a frame, means rotatably mounted in the frame for engaging an article, and means cooperative with said frame and put in operation during manipulation of an article to automatically effect a swinging adjustment of said frame.

8. In a device for manipulating a heavy article, a support, a frame pivotally mounted in the support to swing in an approximately vertical plane during manipulation of an article, and article engaging means mounted in the frame to move in a substantially vertical plane for manipulating an article.

9. In a device for turning extended, heavy articles, a frame, means movably mounted in the frame for engaging an article, and means cooperative with said frame and put in operation during manipulation of an article to automatically effect vertical adjustment of said frame.

10. In a device for turning heavy, extended articles, a support, a frame mounted on the support to automatically swing in a plane at a substantial angle to the length of the article being turned during the turning of such article, and an article engaging structure mounted in the frame to rotate in a plane at a substantial angle to the length of the article being turned.

11. In combination with a straightening machine, effective for applying a force on the side of an article to be straightened, means for turning the article, said turning means being yieldably mounted.

12. In combination with a straightening machine effective for applying a force on the side of an article to be straightened, means for turning the article, and means for yieldably urging the turning means to a desired position and a stop for limiting the action of such means.

13. In combination with a straightening machine effective for applying a force on the side of an article to be straightened, means for turning the article, and means for yieldably urging the turning means to a desired position and a stop for limiting the action of such means, the stop being adjustable.

In testimony whereof, I, a duly authorized officer of and on behalf of the Bethlehem Steel Company, have hereunto attached my signature.

BETHLEHEM STEEL COMPANY,
*Assignee of Harold M. Ely, Deceased.*
By QUINCY BENT,
*Vice President.*